(12) United States Patent
Todd et al.

(10) Patent No.: US 12,039,743 B2
(45) Date of Patent: **\*Jul. 16, 2024**

(54) MOTION TRACKING SYCHRONIZATION IN VIRTUAL REALITY SPACES

(71) Applicant: UNIVERSITY OF WYOMING, Laramie, WY (US)

(72) Inventors: Russell N. Todd, Laramie, WY (US); Qin Zhu, Laramie, WY (US); Derek T. Smith, Laramie, WY (US)

(73) Assignee: UNIVERSITY OF WYOMING, Laramie, WY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/868,537

(22) Filed: Jul. 19, 2022

(65) Prior Publication Data

US 2022/0351393 A1 Nov. 3, 2022

Related U.S. Application Data

(63) Continuation of application No. 16/913,736, filed on Jun. 26, 2020, now Pat. No. 11,393,109.

(Continued)

(51) Int. Cl.
*G06K 9/00* (2022.01)
*G06F 3/01* (2006.01)
(Continued)

(52) U.S. Cl.
CPC .............. *G06T 7/292* (2017.01); *G06F 3/015* (2013.01); *G06F 3/016* (2013.01); *G06T 7/74* (2017.01); *G06T 19/006* (2013.01)

(58) Field of Classification Search
CPC ......... G06T 19/006; G06T 7/292; G06T 7/74; G06T 7/85; G06T 7/593; G06T 11/00;
(Continued)

(56) References Cited

U.S. PATENT DOCUMENTS 9,323,868 B2 4/2016 Balakrishnan et al.
9,489,045 B2 11/2016 Larson et al.
(Continued)

FOREIGN PATENT DOCUMENTS

WO 2018-057666 A1 3/2018

OTHER PUBLICATIONS

Notice of Allowance for U.S. Appl. No. 16/913,736 dated Mar. 18, 2022.

*Primary Examiner* — Phuoc H Doan
(74) *Attorney, Agent, or Firm* — Patterson + Sheridan, LLP (57) ABSTRACT

Embodiments of the present disclosure relate to motion tracking synchronization in virtual reality systems. In an embodiment, a computing system that includes a processor and a memory including computer readable instructions is provided. The processor is configured to, based on execution of the computer readable instructions, receive an indication from a virtual reality (VR) application that the VR application has started, receive tracking data from a first motion tracking system and a second motion tracking system, each motion tracking system comprising one or more sensors, and generate system-independent tracking objects from the tracking data. The processor is further configured to, based on execution of the computer readable instructions, format the system-independent tracking objects into VR objects compatible with a VR system, transmit the VR objects to the VR system, and provide a real world environment view to users overlaid or independent of VR environment. Computer implemented methods are also provided.

27 Claims, 5 Drawing Sheets

Related U.S. Application Data (60) Provisional application No. 62/867,610, filed on Jun. 27, 2019.

(51) Int. Cl.
*G06T 7/292* (2017.01)
*G06T 7/73* (2017.01)
*G06T 19/00* (2011.01)

(58) Field of Classification Search
CPC ....... G06F 3/015; G06F 3/016; H04N 13/239; H04N 5/351; H04N 5/3696; G02B 27/0172
See application file for complete search history.

(56) References Cited

U.S. PATENT DOCUMENTS

| | | |
|---|---|---|
| 2011/0035684 A1 | 2/2011 | Lewis et al. |
| 2014/0235311 A1 | 8/2014 | Weising et al. |
| 2016/0131761 A1 | 5/2016 | Yates et al. |
| 2019/0033988 A1* | 1/2019 | Hesch .................. G06F 3/0346 |
| 2021/0409626 A1* | 12/2021 | Zahnert ................ H04N 25/702 |

* cited by examiner

MOTION TRACKING SYCHRONIZATION IN VIRTUAL REALITY SPACES

CROSS-REFERENCE TO RELATED APPLICATIONS

This application is a continuation of U.S. patent application Ser. No. 16/913,736, now U.S. Pat. No. 11,393,109, filed Jun. 26, 2020, which claims priority to U.S. Provisional Patent Application Ser. No. 62/867,610, filed on Jun. 27, 2019, which is incorporated herein by reference in its entirety.

BACKGROUND

Field

Embodiments of the present disclosure generally relate to motion tracking in virtual reality systems.

Description of the Related Art

In virtual reality systems, tracking the movements of a user of the virtual reality system is often used to enable the user to interact with objects within the virtual reality space created by the virtual reality system. Existing virtual reality systems typically include support for a single motion tracking system to improve user interaction, if motion tracking is supported. However, different motion tracking systems perform better in some situations than others, such as accuracy of small movements compared to accuracy of large movements. For some virtual reality systems, especially many consumer-grade virtual reality systems, other unsupported motion tracking systems provide better or more accurate input than the supported motion tracking system for certain use of the virtual reality system. In addition to motion tracking, other types of sensors (electrocardiogram, electromyogram, electroencephalogram, electrodermal activity, haptic, and force) can augment motion tracking by providing biological data associated with the mover/user.

There is a need for systems and methods which enable synchronization and use of multiple motion tracking systems with virtual reality systems and which have the functionality to integrate other sensors.

SUMMARY

In one embodiment, a computing system is provided. The computing system includes a processor and a memory including computer readable instructions. The processor is configured to, based on execution of the computer readable instructions, receive an indication from a virtual reality (VR) application that the VR application has started, receive tracking data from at least one motion tracking system, and generate system-independent tracking objects from the tracking data. The processor is further configured to, based on execution of the computer readable instructions, format the system-independent tracking objects into VR objects compatible with a VR system, transmit the VR objects to the VR system, provide a REAL view to users overlaid or independent of VR environment, and receive sensor data from one or more sensors.

In another embodiment, a computer implemented method is provided. The method includes receiving an indication from a virtual reality (VR) application that the VR application has started, receiving tracking data from at least one motion tracking system, generating system-independent tracking objects from the tracking data, formatting the system-independent tracking objects into VR objects compatible with a VR system, and transmitting the VR objects to the VR system.

In another embodiment, a computing system is provided. The computing system includes a first motion tracking system, a second motion tracking system, a virtual reality (VR) system, a web camera providing real world (REAL) view, and a host computing device. The host computing device is configured to receive an indication from a VR application and one or more sensors executing on the host computing device that the VR application and the one or more sensors have started, receive first tracking data from the first motion tracking system, and receive second tracking data from the second motion tracking system. The host computing device is further configured to synchronize the first motion tracking system and the second motion tracking system based on the first tracking data and the second tracking data, generate system-independent tracking objects from the first tracking data and the second tracking data, format the system-independent tracking objects into VR objects compatible with the VR system, transmit the VR objects to the VR system, receive sensor data from one or more sensors, synchronize the sensor data with VR and motion tracking system, and transmit the sensor data to the VR system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Embodiments of the present disclosure generally relate to motion tracking in virtual reality systems. Embodiments of the present disclosure provide apparatuses, methods, processing systems, and computer readable mediums for synchronizing motion tracking data received from motion tracking systems. Secondary or peripheral sensors are synchronized with the primary motion tracking system operating in the virtual reality environment to provide additional biological physiological status of the user. Integration of peripheral sensors into the virtual reality motion tracking system facilitates a comprehensive understanding of human motion/movement including analyses of movement performance (e.g., accuracy versus deficiency) as well as physiological stress (e.g., body temperature, heart rate).

In general, existing virtual reality (VR) systems tend to rely on a particular supported motion tracking system to support motion- or gesture-based interaction with a VR application. Frequently for consumer-grade VR systems, this supported motion tracking system is included with the VR system as sold. For example, the HTC Vive® VR system includes an optical tracking system, and only the optical tracking system is supported by default. Conventional optical tracking systems use a series of sensors that maintain line-of-sight contact with a tracked object to perform effective tracking.

Optical tracking systems are commonly used in VR systems, especially consumer-grade VR systems, as they are relatively inexpensive and reliable, compared to other types of motion tracking systems. However, conventional optical tracking systems have some drawbacks. For example, motion tracking can be interrupted if line-of-sight between the sensors and the tracked object is lost. Further, conventional optical tracking systems may be adequately accurate for many types of tracked motion, but may not track fine or small-distance movements with high accuracy and precision.

One alternative to optical tracking systems are electromagnetic tracking systems. Conventional electromagnetic tracking systems use one or more electromagnetic transmitters and one or more fixed sensors to track the movement of the sensors within range of the transmitters. Sensors in such systems are either wired or wireless. Electromagnetic tracking systems are often more accurate than optical tracking systems, especially for fine or precise motions. However, as stated above, existing VR systems tend to support a single type of motion tracking system. Thus, a VR application that may benefit from use of one type of motion tracking system may suffer in performance if a different type of motion tracking system is supported by the VR system executing the VR application.

Described herein are systems and methods providing for the use of two or more motion tracking systems, and optionally, one or more peripherals (sensors), with a single VR system. In general, by converting the tracking data of a particular motion tracking system to system-independent tracking objects, those system-independent tracking objects are then used with any VR system after appropriate formatting. Because the system-independent tracking objects are used without regard to a VR system supporting a particular motion tracking system, any motion tracking system can be used with the VR system. Further, by performing a calibration to synchronize a first motion tracking system and a second motion tracking system, data from both motion tracking systems is used by the VR system simultaneously, enabling a particular VR system to make use of the advantages of multiple types of motion tracking systems, such as using an optical tracking system and an electromagnetic tracking system, simultaneously. Additionally, peripheral sensors that capture the biological and/or physiological status of the human body are added to augment motion tracking and feedback, enabling a comprehensive understanding of human performance. Peripheral sensors include but are not limited to electrocardiogram, electromyogram, electroencephalogram, electrodermal activity, haptic, and force sensors. The peripheral sensors increase detection and capture of movement and enhance performance (e.g., accuracy, range of motion, speed, etc.) by measuring meaningful complimentary biological and/or physiological data from the mover/user. For example, movement feedback is provided to a user performing movement tasks in the VR environment based singularly on motion tracking and analysis (e.g., movement time on task or successful attempts). Peripheral sensors augment this feedback by measuring, e.g., muscle activation (electromyogram) and/or physiological stress (e.g., heart rate, body temperature) during the movement. Accordingly, the systems and methods described herein enable a holistic or comprehensive understanding of human performance. Inclusion and syncing of such sensors enhance capacity and functionality of the motion tracking system in the VR environment. In a rehabilitation application setting, for example, changes in movement accuracy combined with changes in biological and/or physiological parameters facilitate informed and evidence-based decisions about therapeutic movement progression.

Certain embodiments of the present disclosure provide techniques for synchronizing motion tracking data for virtual reality systems and integrating relevant movement/motion sensor data. One example computing system includes a processor and a memory including computer readable instructions. The processor is configured to, based on execution of the computer readable instructions, receive an indication from a virtual reality application that the virtual reality application has started and receive tracking data from the at least one motion tracking system and optional peripheral sensors. The processor is further configured to generate system-independent tracking objects from the tracking data, format the system-independent tracking objects into virtual reality objects compatible with a virtual reality system, transmit the virtual reality objects to the virtual reality system, and analyze motion data with or without integrated and synchronized peripheral sensor data. The software technology is flexible to integrate various virtual reality and sensor hardware and is application agnostic (interoperable). Anticipated applications and industries include telemedicine (physical therapy, occupational therapy), fine and gross motor skill remote training (security and defense), and aerospace.

Figure 1:
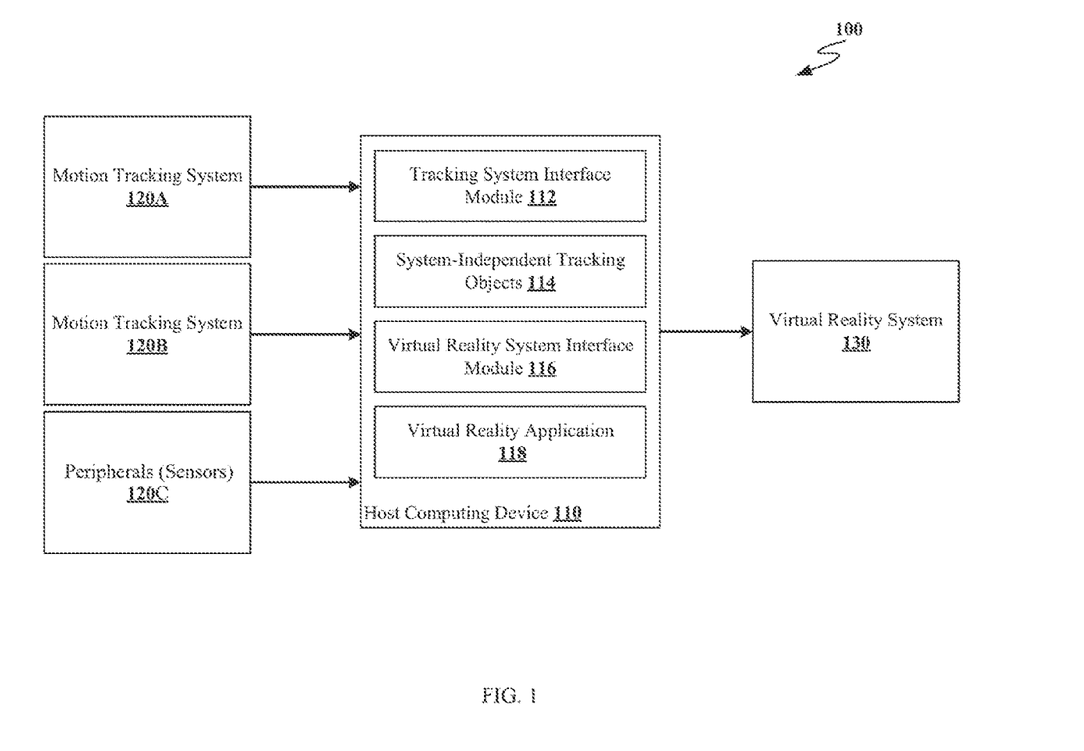
FIG. 1 depicts an example computing environment for synchronizing motion tracking data, according to at least one embodiment.

FIG. 1 depicts an example computing environment 100 for synchronizing motion tracking data, and optionally, one or more peripherals (sensors). The computing environment 100 includes host computing device 110, motion tracking systems 120A and 120B, optional peripherals (sensors) 120C, and VR system 130.

Host computing device 110 is a computing device such as a laptop computer, desktop computer or other computing device capable of accepting input from motion tracking systems and routing that input to VR systems and real world environment/setting (REAL) views. In general, host computing device 110 serves as an interface (collects, integrates, routes, and analyzes data) for motion tracking systems 120A and 120B with VR system 130. Host computing device 110 also provides processing and memory resources necessary to execute a virtual reality application 118 using VR system 130.

Motion tracking systems 120A and 120B are motion tracking systems, such as optical motion tracking systems or electromagnetic tracking systems, or other systems used to track and update the movement of a user or a controller used by the user.

Optionally, one or more peripherals (sensors) 120C are included in the computing environment 100. The one or more peripherals (sensors) 120C are sensors to provide additional data, such as biological data and/or additional movement data, associated with the user. The one or more peripherals (sensors) 120C are secondary inputs to the motion tracking system and provide additional input as to, e.g., movement analysis. In one embodiment, the one or more peripherals (sensors) 120C are used to augment or further inform motion tracking by providing information about, e.g., physiological responses of movement/motion. For example, the one or more peripherals (sensors) 120C provide information about what muscle is activated or inactivated during movement/motion, how much a user's skin temperature is increasing or decreasing during movement/motion, and/or how much a user's heart rate is increasing or decreasing during movement/motion.

The one or more peripherals (sensors) 120C include, but are not limited to, electromechanical sensors such as gyroscopes, accelerometers, potentiometers, or magnetometers to track movement and rotation of objects embedded with the sensors. The one or more peripherals (sensors) 120C additionally, or alternatively, include direct body-contact haptic sensors or sensors interpreting electrical impulses from a user's body. Non-limiting examples of peripherals (sensors) include, but are not limited to, an electrocardiogram, an electromyogram, an electroencephalogram, an electrodermal activity sensor, a haptic sensor, and a force sensor.

Virtual reality system 130 is a system for providing a VR environment for a user of virtual reality system 130. VR system 130 includes at least a VR headset to be worn by the user and one or more display devices to simulate an environment for the user. To provide user interaction with the simulated environment, VR system 130 supports use of a motion tracking system and, optionally, one or more peripherals (sensors).

In an example VR system supporting a single motion tracking system, host computing device 110 is used as a pass-through for motion tracking data. That is, host computing device 110 directly receives tracking data from a motion tracking system and forwards that tracking data to a VR system as input to the VR system. Additionally, host computing device 110 directly receives data from other types of peripherals (sensors) 120C (listed above) and integrates the sensor data within the system to augment motion tracking by providing biological data associated with the mover/user.

In this example, two motion tracking systems, and optionally, one or more peripherals (sensors), are supported. To use both motion tracking systems 120A and 120B with VR system 130, tracking system interface module 112, a software routine executing within host computing device 110, is used. Tracking system interface module 112 first determines that VR application 118 has started, and subsequently establishes communication with motion tracking systems 120A and 120B. Then, tracking system interface module 112 receives input from motion tracking systems 120A and 120B and uses the input to generate system-independent tracking objects 114. As described in greater detail below, system-independent tracking objects 114 are tracking data configured in a format independent of either motion tracking system 120A or 120B, and can thus be used with any VR system. In other words, the system-independent tracking objects 114 are VR system and manufacturer agnostic and can be utilized, due to agnostic formatting, in any VR system.

After system-independent tracking objects 114 are generated, VR system interface module 116, another software routine of host computing device 110, is used to format the system-independent tracing objects 114 into a format supported by VR system 130. Then, VR system interface module 116 transmits the formatted tracking objects to VR system 130, as input to VR system 130.

Unlike existing VR systems, computing environment 100 is a system enabling simultaneous use of multiple motion tracking systems and optionally, one or more peripherals (sensors), by a single VR system. Thus, compared to existing VR systems, computing environment 100 provides more accurate input to VR system 130 than is possible in existing VR systems, since existing VR systems are limited to a single motion tracking system, and thus a single type of motion tracking system.

Figure 2:
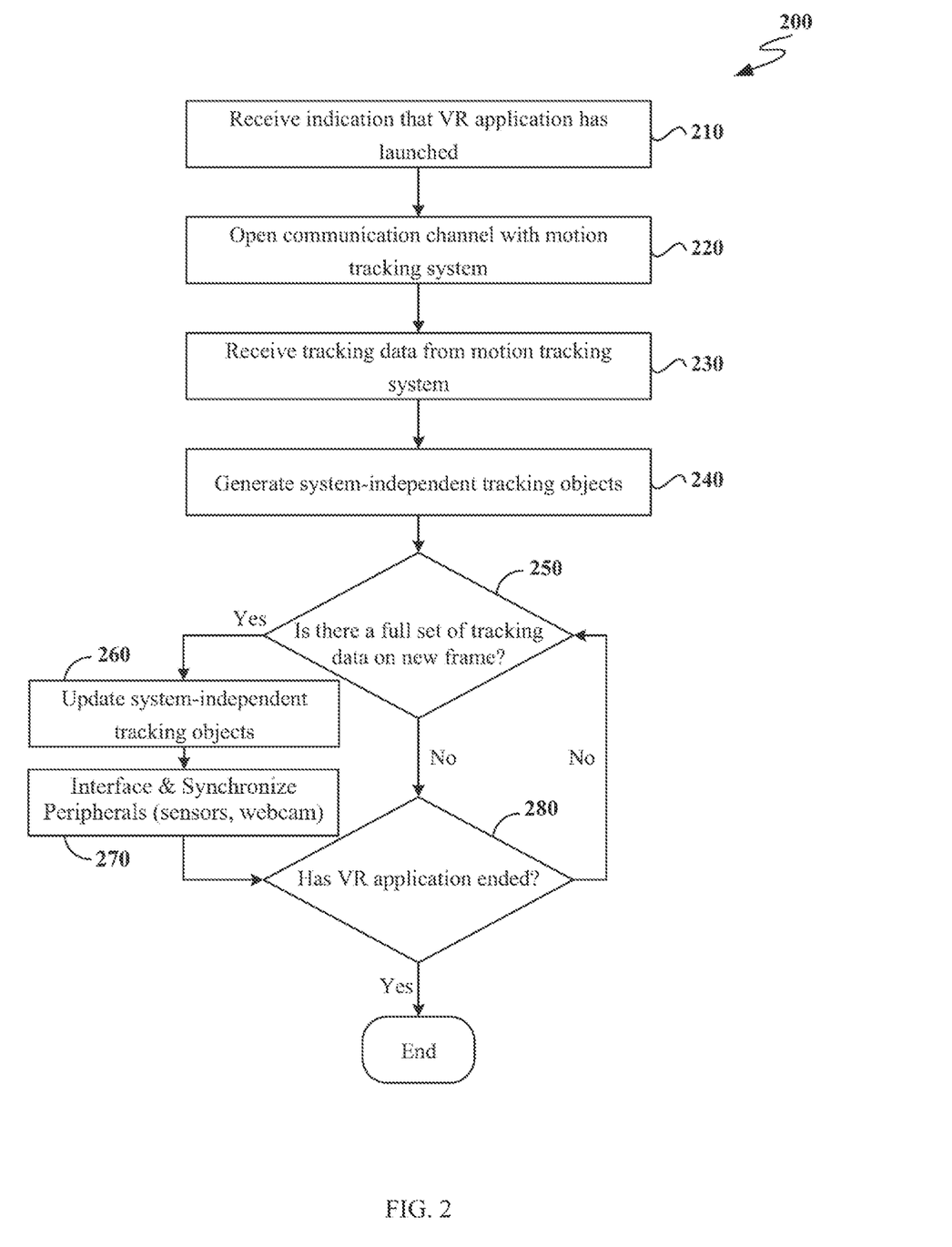
FIG. 2 is a flow chart of example operations for receiving and updating motion tracking data, according to at least one embodiment.

FIG. 2 is a flow chart of example operations 200 for receiving and updating motion tracking data. Operations 200 are performed by a host computing device, such as host computing device 110 of FIG. 1. Operations 200 begin at 210, where the host computing device receives an indication that a VR application launched. The VR application makes use of a VR system used by the host computing device, to provide a VR experience to a user. In one embodiment, the VR application is a simulator such as for training purposes, or a game. To integrate a VR application with synchronized motion tracking data, an application-specific software routine is provided to transmit an indication of VR application startup to other routines of the host computing device.

At 220, the host computing device opens a communication channel with a motion tracking system. In some examples, the communication channel is a user datagram protocol (UDP) connection between the host computing device and the motion tracking system. In other examples, the communication channel is a transmission control protocol (TCP) connection, and internet protocol (IP) connection or various other communication or data transfer protocols. If using UDP or TCP connections, the host computing device opens the communication channel by opening a particular port of the host computing device and initiating a UDP or a TCP communication.

At 230, the host computing device receives tracking data from the motion tracking system over the established communication channel. In general, tracking data received from a motion tracking system is of a format associated with the motion tracking system. That is, every motion tracking system transmits data in a format unique to that motion tracking system. In general, tracking data includes a number of data points, such as position and rotation coordinates or time stamps. Tracking data is typically transmitted by the motion tracking system for every frame of the VR application. For some noisy data, a low-pass filter is used to ignore incorrect data.

In some examples, position coordinates include three data points (X, Y, Z), rotation coordinates include three data points (X, Y, Z) that, in some embodiments, represent yaw, pitch, and roll, and the timestamp is a further data point, such that a single frame of tracking data includes seven data points. In one or more embodiments, translation coordinates are present, in addition to position, rotation, and timestamp data. To prevent inaccurate data from being used, data from motion tracking systems is typically transmitted as strings to avoid rounding. If the motion tracking system tracks multiple objects (e.g., two controllers in an optical tracking system), tracking data includes multiple full sets of tracking data (e.g., position coordinates, rotation coordinates and a timestamp) for each tracked object.

At 240, the host computing device generates system-independent tracking objects based on the tracking data. First, the host computing device instantiates a data structure to hold the system-independent tracking objects, which, in one embodiment, is a two-dimensional array that can be dynamically resized. When stored in an array tracking data may be labeled with a header identifying the object tracked (e.g., electromagnetic sensor 1, electromagnetic sensor 2, etc.). If a timestamp is included with the tracking data, the host computing device strips a timestamp-indicating character (e.g., the letter "t") from the timestamp. Then, the host computing device converts the strings received from the tracking data into floating point numbers (floats) to be stored in the data structure. The floats are readable by a vast majority of hardware and software languages, thus, the system-independent tracking objects are system agnostic and can be included in the data structure for utilization by a myriad of VR systems with improved sensing accuracy that exhibits higher movement resolution.

At 250, the host computing device determines if there is a full set of tracking data on a new frame of the VR application. In general, the host device makes this determination to update the system-independent tracking objects as needed. If there is a full set of tracking data, operations 200 proceed to 260, where the host computing device updates the system-independent tracking objects based on the tracking input from the new frame. Updating the system-independent tracking objects are or include the same process as shown at 240, including converting received strings to floats. In some cases, updating the system-independent tracking objects may include converting rotation data of the tracking data to the Quaternion format. The Quaternion format is used by some utilities, such as the Unity® engine. Conversion to Quaternion format also helps avoiding gimbal lock of the rotation data. After the host computing device updates the system independent tracking objects, operations 200 proceed to 270, where sensor data from the one or more peripherals (e.g., sensors, webcam) interfaces and synchronizes with the VR and the motion tracking system. Operation 270 can mirror the operations 220-250 of the motion tracking system. Accordingly, at operation 270, the host computing device opens a communication channel with the one or more peripherals and receives appropriate data from the peripheral device. The host computing device then generates an appropriate data structure from the context for incoming peripheral data, and updates and/or refreshes data incoming from the one or more peripherals in a same or similar manner as the motion the tracking systems until the application ends.

If there is not a full set of tracking data, operations 200 proceed to 280, where the host computing device determines if the VR application has ended. If there is not a full set of tracking data available but the VR application is still running, there may be an issue with the motion tracking system. For example, if line-of-sight for an optical tracking sensor is lost, a full set of tracking data may not be available. If the VR application has not ended, operations 200 return to 250, where the host computing device again determines if a full set of tracking data is available on a new frame. If the VR application has ended, operations 200 also end.

In general, operations 200 represent a process for receiving tracking data from a single motion tracking system and generating system-independent tracking objects based on the tracking data. However, operations 200 may be extended to support receiving tracking data from multiple motion tracking systems, by opening a communication channel for each motion tracking system, each communication channel occupying a port of the host computing device. Then, the host computing device performs operations 200 for each motion tracking system in parallel, albeit modifying the same data structure of system-independent tracking objects for both motion tracking system.

Figure 3:
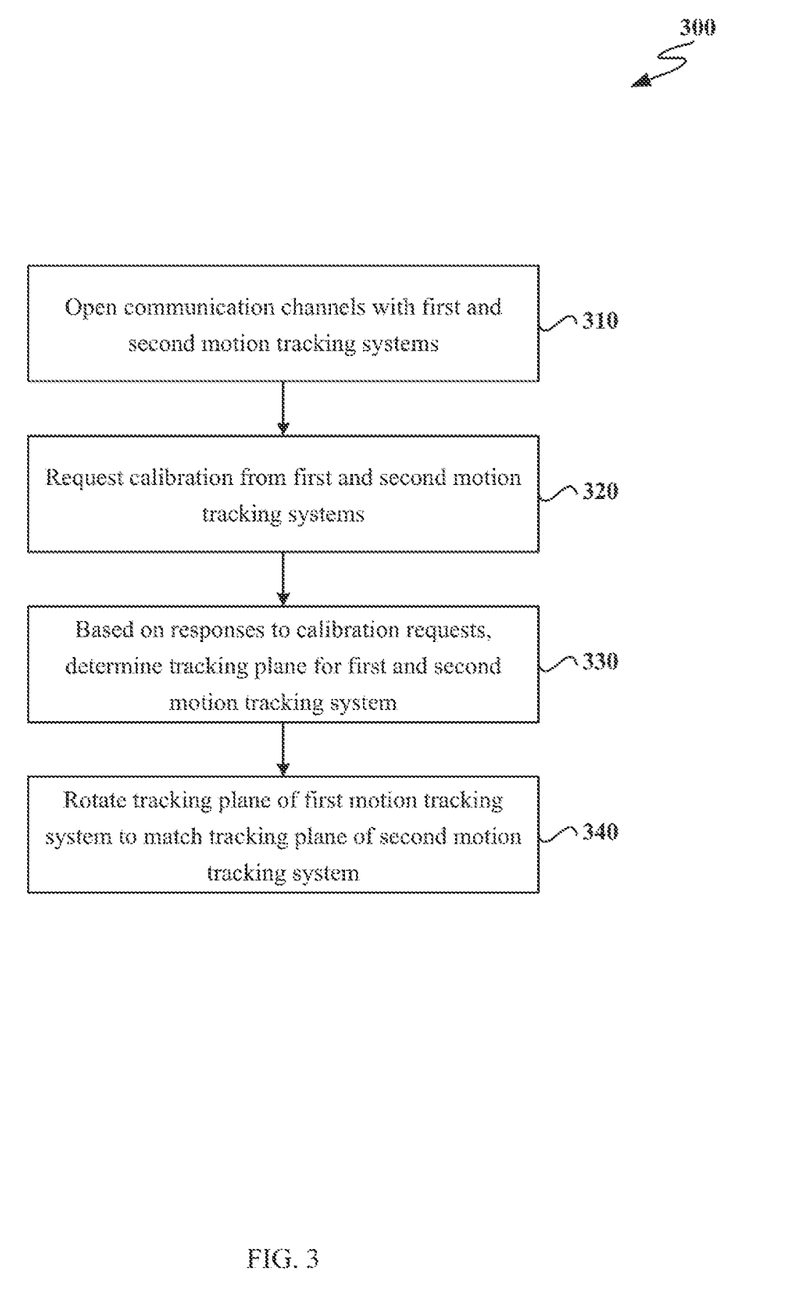
FIG. 3 is a flow chart of example operations for synchronizing motion tracking systems, according to at least one embodiment.

FIG. 3 is a flow chart of example operations 300 for synchronizing motion tracking systems. Operations 300 may be performed by a host computing device, such as host computing device 110 of FIG. 1. Operations 300 begin at 310, where the host computing device opens communication channels with a first motion tracking system and a second motion tracking system. As discussed above the communication channels may be TCP or UDP connections between the motion tracking systems and the host computing device.

At 320, the host computing device requests calibration from the first and the second motion tracking systems. In other examples, calibration is initiated by the motion tracking systems, by, for example, a pressing of a calibration button associated with the motion tracking systems. Generally, to calibrate, three locations' objects tracked by each motion tracking system are used. In 3D space, the three locations' objects define a tracking plane of each motion tracking system. Thus, a user completes the calibration request by pressing the calibration button in each of three positions to define the tracking plane for the motion tracking systems.

At 330, the host computing device determines tracking planes for the first and the second motion tracking systems, based on responses to the calibration requests. As stated above, the responses include three locations' objects for both motion tracking systems, and are used to define a tracking plane for the motion tracking systems. The host computing device uses the three locations' objects to calculate the tracking planes.

At 340, the host computing device rotates the tracking plane of the first motion tracking system to match the tracking plane of the second motion tracking system. The two tracking planes are close to a match rotationally before rotation is performed. However, matching the two tracking planes to the same tracking plane ensures accurate input to VR systems. Thus, one tracking plane is rotated, such as by applying an adjustment to each data point of rotation or position, so that the tracking planes of the motion tracking systems are synchronized. Thereafter, tracking data received from the rotated motion tracking system has the same adjustment applied to maintain the proper synchronization between the motion tracking systems.

For the one or more peripherals, a calibration sequence similar to the motion tracking system is performed. Here, the host computing device opens a communication channel with the one or more peripherals, receives appropriate data from the peripheral device, generates an appropriate data structure from the context for incoming peripheral data, and updates and/or refreshes data incoming from the one or more peripherals in a same or similar manner as motion the tracking systems until the application ends.

Figure 4:
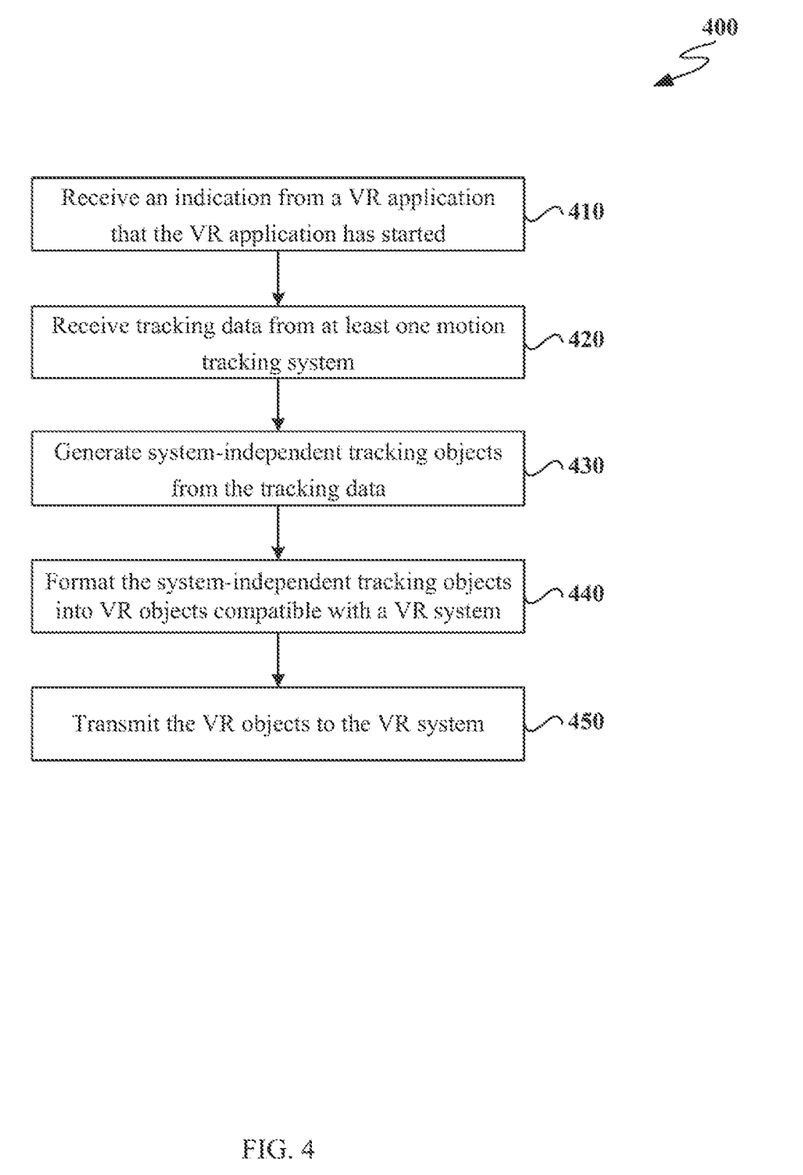
FIG. 4 is a flow chart of an example method for synchronizing motion tracking data, according to at least one embodiment.

FIG. 4 is a flow chart of an example method 400 for synchronizing motion tracking data. Method 400 may be performed by a host computing device, such as host computing device 110 of FIG. 1. Operations of method 400 being at 410, where the host computing device receives an indication from a VR application that the VR application has started. In one embodiment, the VR application is a game or a simulator utilizing motion tracking in a VR space.

At 420, the host computing device receives tracking data from at least one motion tracking system. Typically, the host computing device initiates communication with the at least one motion tracking system, by opening a communication channel with the at least one motion tracking system. Then, the at least one motion tracking system transmits tracking data over the communication channel until the communication channel is closed.

At 430, the host computing device generates system-independent tracking objects from the tracking data. As described in greater detail above, generating system-independent tracking objects typically involves formatting the tracking data received from motion tracking systems, such as by stripping identifying characters from received strings, converting the received strings into floats, and/or performing other modifications such as re-ordering received data or decomposing received data into the elements used in the system-independent tracking objects.

At 440, the host computing device formats the system-independent tracking objects into VR objects compatible with a VR system. For some VR systems, little or no is formatting appropriate of the system-independent tracking objects for use with those VR systems. Other VR systems utilize more formatting, such as converting rotation data stored as a three-point coordinate system to the Quaternion format. In other cases, position data is also converted to a format used by a particular VR system.

At 450, the host computing device transmits the VR objects to the VR system. In some embodiments, the VR objects are sent instead to the VR application, which in turn processes the VR objects and sends display data for display on a VR headset of the VR system. The VR system receives the display data, which includes data from a plurality or sensors, and displays an image on the VR headset with improved location and motion tracking accuracy. Such improved location and tracking accuracy results in a more realistic VR environment and improved a user's VR experience interacting with the VR environment.

In some cases, method 400 further includes second tracking data from a second motion tracking system and adding the second tracking data to the system-independent tracking objects. This process involves the same or similar conversion performed on the tracking data received from the first motion tracking system, modified for the format of data supplied by the second motion tracking system. In such systems, method 400 further includes calibrating the at least one motion tracking system and the second motion tracking system to provide for synchronization of tracking data from the at least one motion tracking system and the second motion tracking system.

In some cases, the at least one motion tracking system is an electromagnetic tracking system. In some cases, the second motion tracking system is an optical tracking system. Tracking systems may incorporate wired or wireless sensors.

For the one or more peripherals, the host computing device receives data from the one or more peripherals. Typically, the host communication initiates communication by opening a communication channel with the one or more peripherals. The host computing device then generates an appropriate data structure which can be continually updated similar to the data structure for the motion tracking system. The host computing device then reads from that structure. As an example where the one or more peripherals includes a heartrate monitor, the host computing device forms the initial connection with the heartrate monitor and then reads the data from the heartrate monitor at the same or a similar time as when the host computing device updates the current motion tracking system sensor positions.

Some examples of method 400 can further include recording, as recorded input, the VR objects used as input to the VR system. To do so, a software routine of the computing device writes headers to each column of a 2D array used to store the system-independent tracking objects. The headers include a name of a sensor associated with the 2D array. When the VR application ends, the host computing device saves the system-independent tracking objects including the headers as a comma-separated values (CSV) file. In such examples, method 400 further includes replaying the VR application using the recorded input. In other such examples, method 400 further includes generating, based on the recorded input, an input visualization.

In some examples, method 400 further includes receiving additional input from the at least one motion tracking system and updating the system-independent tracking objects based on the additional input.

Figure 5:
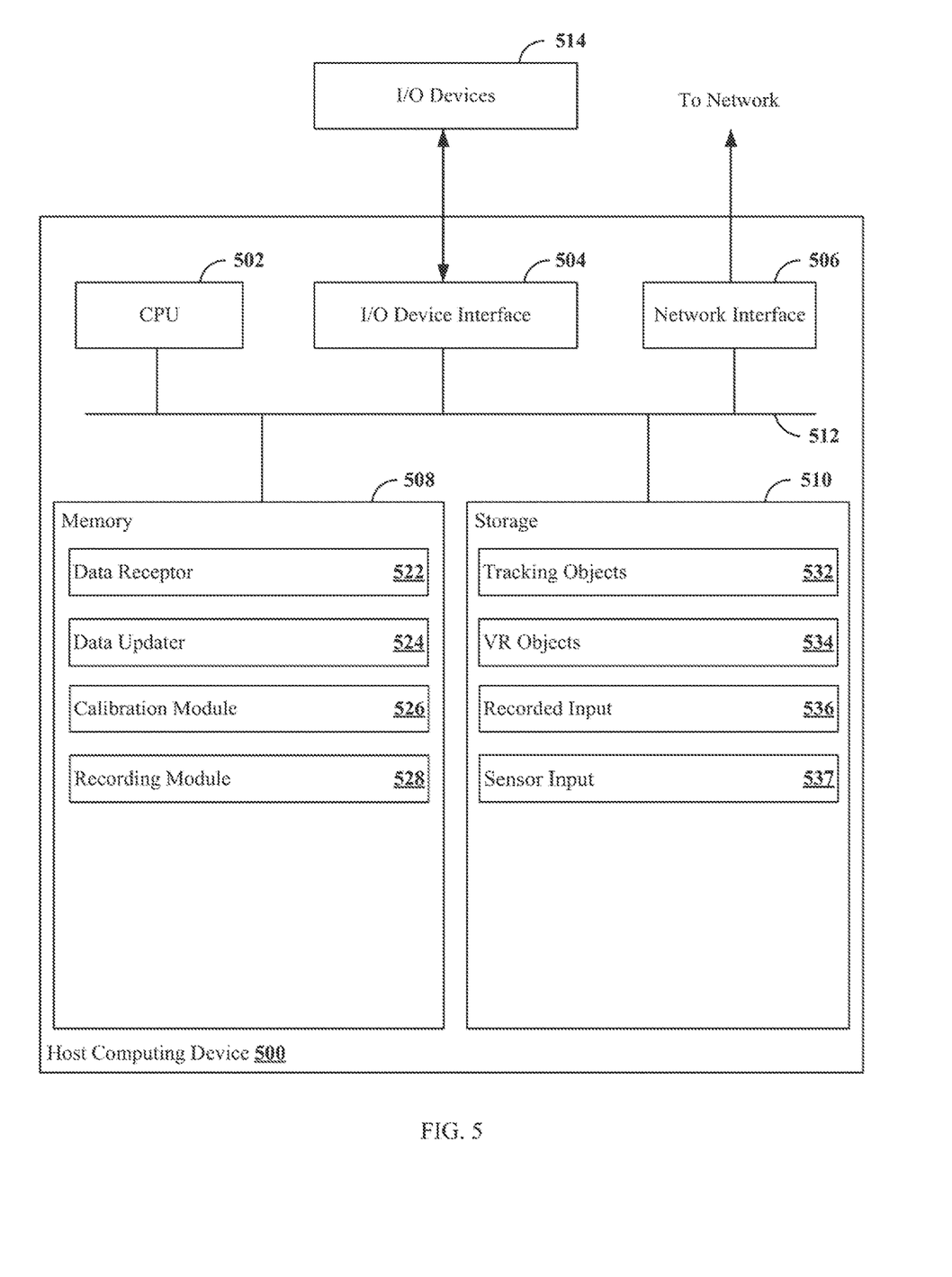
FIG. 5 is a block diagram of an example host computing device, according to at least one embodiment.

FIG. 5 is a block diagram of an example host computing device 500. As shown, host computing device 500 includes, without limitation, a central processing unit (CPU) 502, one or more input/output (I/O) device interfaces 504, which may allow for the connection of various I/O devices 514 (e.g., keyboards, displays, mouse devices, pen input, etc.) to host computing device 500, network interface 506, memory 508, storage 510, and an interconnect 512. The host computing device 500 is a stand-alone system, and one or more parts of the host computing device 500 are integrated into another computer system, such as a virtual reality system. Moreover, it is contemplated that one or more components of host computing device 500 are located remotely and accessed via a network, and/or virtualized. The various I/O devices 514 include one or more peripherals (e.g., one or more sensors).

The CPU 502 retrieves and executes programming instructions stored in the memory 508. Similarly, the CPU 502 retrieves and stores application data residing in the memory 508. The interconnect 512 transmits programming instructions and application data, among the CPU 502, I/O device interface 504, network interface 506, memory 508, and storage 510. The CPU 502 is included to be representative of a single CPU, multiple CPUs, a single CPU having multiple processing cores, and the like. The I/O device interface 504 provides an interface for capturing data from one or more input devices integrated into or connected to host computing device 500, such as keyboards, mice, touch-screens, and so on. The memory 508 represents a random access memory (RAM), while the storage 510 is a solid state drive, for example. Although shown as a single unit, the storage 510 may be a combination of fixed and/or removable storage devices, such as fixed drives, removable memory cards, network attached storage (NAS), or cloud-based storage.

As shown, the memory 508 includes data receptor 522, data updater 524, calibration module 526 and recording module 528, which are software routines executed based on instructions stored in the storage 510. Such instructions are executed by the CPU 502.

As shown, the storage 510 includes tracking objects 532, VR objects 534, recorded input 536, and sensor input 537. Data receptor 522 receives tracking data from one or more connected tracking systems, and then stores the received tracking data as tracking objects 532. Then, data receptor 522 converts tracking objects 532 to VR objects 534, which is then sent to a connected VR system for display. Data updater 524 receives updated data from the one or more connected motion tracking systems, and updates VR objects 534 to reflect the updated data. If more than one motion tracking system is connected, calibration module 526 requests calibration data from the motion tracking systems, and calibrates the motion tracking system as necessary to synchronize the tracking data as stored as VR objects 534. In some cases, recording module 528 stores VR objects 534 sequentially as recorded input 536. Recorded input 536 can then be used for various processes, such as replaying a VR application using the tracked motion, or generating a data visualization of the tracked motion. Sensor input 537 is used for sensors and other devices.

In summation, the embodiments and examples described herein provide for improved motion tracking synchronization from multiple motion sensors (and peripheral sensors) in a VR environment. The data received from the various motion and peripheral sensors is modulated to a system independent format when enables utilization of the data by various VR systems. The system agnostic nature of the data formatting enables receipt of data from a plurality of sensor types and transmission to the VR system in a readable manner to improve display characteristics on the VR device. The motion tracking data detected from multiple sensors is synchronized to facilitate improved motion accuracy, magnitude, and resolution when the data is displayed on the VR system to provide for an improved VR environment experience for the user.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the embodiments set forth herein. In addition, the scope of the disclosure is intended to cover such an apparatus or method that is practiced using other structure, functionality, or structure and functionality in addition to, or other than, the various embodiments of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other embodiments.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computing system, comprising:
a processor; and
a memory including computer readable instructions, wherein the processor is configured to, based on execution of the computer readable instructions:
receive an indication from a virtual reality (VR) application that the VR application has started;
receive tracking data from a first motion tracking system, the first motion tracking system comprising one or more sensors;
generate tracking objects from the tracking data;
format the tracking objects into VR objects compatible with a VR system;
transmit the VR objects to the VR system; and
provide a real world environment view to users overlaid or independent of a VR environment.

2. The computing system of claim 1, further comprising:
a second motion tracking system comprising one or more sensors.

3. The computing system of claim 2, wherein the tracking data from the first motion tracking system and tracking data from the second motion tracking system is formatted similarly or differently.

4. The computing system of claim 1, wherein the processor is configured to calibrate the first motion tracking system.

5. The computing system of claim 2, wherein the processor is configured to calibrate the second motion tracking system.

6. The computing system of claim 1, wherein the first motion tracking system is an electromagnetic tracking system.

7. The computing system of claim 1, wherein the first motion tracking system is an optical tracking system.

8. The computing system of claim 1, wherein the one or more sensors comprise an electrocardiogram, an electromyogram, an electroencephalogram, an electrodermal activity sensor, a haptic sensor, a force sensor, or a combination thereof.

9. The computing system of claim 1, wherein the processor is further configured to record, as recorded input, the VR objects used as input to the VR system.

10. The computing system of claim 9, wherein the processor is further configured to replay the VR application using the recorded input.

11. The computing system of claim 9, wherein the processor is further configured to generate, based on the recorded input, an input visualization.

12. The computing system of claim 2, wherein the processor is further configured to:
receive additional input from one or both of the first motion tracking system and the second motion tracking system; and
update the tracking objects based on the additional input.

13. A computer-implemented method, comprising:
receiving an indication from a virtual reality (VR) application that the VR application has started;
receiving tracking data from a first motion tracking system, the first motion tracking system comprising one or more sensors;
generating tracking objects from the tracking data;
formatting the tracking objects into VR objects compatible with a VR system; and
transmitting the VR objects to the VR system.

14. The computing system of claim 13, further comprising:
a second motion tracking system comprising one or more sensors.

15. The computing system of claim 14, wherein the tracking data from the first motion tracking system and tracking data from the second motion tracking system is formatted similarly or differently.

16. The computer-implemented method of claim 14, further comprising:
calibrating the first motion tracking system and the second motion tracking system.

17. The computer-implemented method of claim 13, wherein the first motion tracking system is an electromagnetic tracking system.

18. The computer-implemented method of claim 13, wherein the first motion tracking system is an optical tracking system.

19. The computer-implemented method of claim 13, further comprising recording, as recorded input, the VR objects used as input to the VR system.

20. The computer-implemented method of claim 19, further comprising replaying the VR application using the recorded input.

21. The computer-implemented method of claim 19, further comprising:
generating, based on the recorded input, an input visualization.

22. The computer-implemented method of claim 14, further comprising:
receiving additional input from one or both of the first motion tracking system and the second motion tracking system; and
updating the tracking objects based on the additional input.

23. A computing system, comprising:
a first motion tracking system;
a virtual reality (VR) system;
a web camera providing a real world environment view; and
a host computing device, wherein the host computing device is configured to:
receive an indication from a VR application and one or more sensors executing on the host computing device that the VR application and the one or more sensors have started;
receive first tracking data from the first motion tracking system;
generate tracking objects from the first tracking data;
format the tracking objects into VR objects compatible with the VR system;
transmit the VR objects to the VR system;
receive sensor data from the one or more sensors;
synchronize the sensor data with the VR application and the first motion tracking system; and
transmit the sensor data to the VR system.

24. The computing system of claim 23, further comprising:
a second motion tracking system.

25. The computing system of claim 24, wherein the host computing device is configured to: receive second tracking data from the second motion tracking system; and based on the first tracking data and the second tracking data, synchronize the first motion tracking system and the second motion tracking system.

26. The computing system of claim 23, wherein the first motion tracking system is an optical tracking system.

27. The computing system of claim 23, wherein the first motion tracking system is an electromagnetic tracking system.

* * * * *